3,060,142
Patented Oct. 23, 1962

3,060,142
PROCESS FOR MAKING ACRYLONITRILE POLYMER SOLUTIONS EMPLOYING A REDUCING AGENT
Vera Isabella Furness, Coventry, England, assignor to Courtaulds Limited, London England, a British company
No Drawing. Filed Jan. 21, 1959, Ser. No. 788,057
Claims priority, application Great Britain Feb. 11, 1958
3 Claims. (Cl. 260—29.6)

This invention relates to the production of solutions of polyacrylonitrile and to the production from such solutions of shaped articles, such as threads, fibres, filaments, staple fibres, ribbons, films and the like, hereinafter generally referred to as "threads." The term "polyacrylonitrile" as used in this specification includes simple polymers of acrylonitrile and copolymers containing at least 80 percent of acrylonitrile in the molecule, together with up to 20 percent of one or more other polymerisable compounds such as styrene, methyl acrylate, vinyl pyridine, itaconic acid and vinyl acetate.

The specification of the Schmidt application Serial No. 608,706, filed September 10, 1956, describes a process for the production of a solution of polyacrylonitrile as defined above which comprises dissolving acrylonitrile, together with the other copolymerisable compounds when such are used, in a concentrated solution of an inorganic thiocyanate such as sodium thiocyanate and polymerising the monomer or monomers in solution in the presence of a non-oxidising polymerisation catalyst forming free radicals; examples of suitable catalysts mentioned in the specification are azo compounds, the preferred catalyst being azo-bis-isobutyronitrile.

When solutions of polyacrylonitrile are prepared in this way using azo catalysts there is a tendency for a yellow colour to develop in the solution and for this colour to persist in the threads, eventually produced from the solution. The specification of my application Serial No. 690,637, filed October 7, 1957, describes and claims a method of reducing this discolouration by carrying out the solvent polymerisation in a concentrated solution of an inorganic thiocyanate at a pH of 6.0 to 8.0 in the presence of an azo compound such as azo-bis-isobutyronitrile and a reducing agent, for example thiourea dioxide, which is inert to the azo compound under the polymerising conditions.

I have now found that the colour of solutions of polyacrylonitrile obtained as described in Schmidt application Serial No. 608,706, Patent No. 2,923,694, using azo catalysts and particularly azo-bis-isobutyronitrile is sensitive to the pH of the reaction mixture this being the case whether or not a reducing agent is present as described in my application Serial No. 690,637; consequently I have found that marked improvements in the colour of the solutions, and of the threads made from the solutions, are obtained by operating at specific pH values which are below the range of 6.0 to 8.0 specified in my said application No. 690,637.

In accordance with this invention, the polymerisation process described and claimed in the specification of the Schmidt application No. 608,706 using an azo catalyst and if desired a reducing agent as described in my application No. 690,637 is carried out at a pH value in the range of 3.5 to 5.5, and preferably 4 to 5.

In accordance with the present invention, therefore, a process for the production of a solution of a polymer of acrylonitrile, or of a copolymer containing at least 80 percent by weight of acrylonitrile in the molecule, comprising dissolving acrylonitrile, together with one or more co-polymerisable compounds when such are used, in a concentrated solution of an inorganic thiocyanate and polymerising the monomer or monomers in the solution in the presence of a non-oxidising azo polymerisation catalyst forming free radicals, the pH value of the solution during polymerisation being maintained in the range of 3.5 to 5.5 and preferably 4 to 5.

The process of this invention is preferably carried out in the presence of a reducing agent such as thiourea dioxide which is inert to the azo catalyst as described in my application No. 690,637.

The polymer solutions obtained by the process of this invention may be extruded directly through jets into aqueous coagulation baths to form threads.

The preferred thiocyanate solution for use in this invention is sodium thiocyanate solution, the concentration of the solution being at least 40 percent, and preferably 45–55 percent, by weight. Other thiocyanates, for example calcium thiocyanate, may however be used. The solution is preferably an aqueous solution but aqueous-alcoholic solutions may be used.

The preferred azo catalyst for use in this invention is azo-bis-isobutyronitrile but other azo compounds disclosed in Schmidt's application No. 608,706 for example azo-bis-isobutyric acid esters may also be used, and also the azo compounds disclosed in Hunt's United States Patent No. 2,471,959.

When a reducing agent is used in the polymerising solution the preferred agent is thiourea dioxide and threads with very little or no discolouration have been obtained by using a concentrated aqueous sodium thiocyanate solution (45 to 55 percent by weight concentration) with azo-bis-isobutyronitrile as initiator and thiourea dioxide as reducing agent (1 to 3 percent by weight based on the weight of the monomers) and working at a pH value in the range of 4 to 5. Other reducing agents such as sodium formaldehyde sulphoxylate and sodium metabisulphite may be used in place of the thiourea dioxide, but the latter compound is preferred.

When sodium thiocyanate crystals as available commercially are dissolved in water to form a concentrated solution, the pH value of the solution varies slightly depending on the source of supply but in general the pH value of the solution will be in the range of 7 to 8. Neutral polymerisable compounds such as acrylonitrile and methyl acrylate will have practically no effect on the pH so that it will be necessary to add an acid reagent such as hydrochloric acid to lower the pH of such solutions to the desired range of 3.5 to 5.5 and preferably 4 to 5. When thiourea dioxide is added to the thiocyanate solution the pH will be lowered and with about 1 percent of thiourea dioxide present (based on the weight of the monomers), the pH will generally be below 4 and adjustment of the pH will be required. When an acid polymerisable compound is used, for example itaconic acid, in conjunction with the acrylonitrile the pH value in the presence or absence of thiourea dioxide will be appreciably lower than the 3.5 of the pH range used in this invention and in all these cases it is necessary to add an alkali such as caustic soda to the mixture to bring the pH value within the desired range.

When the thiocyanate solution, or a part of it, has been obtained by recovering and evaporating the spinning solution obtained by extruding the polymer solution into an aqueous coagulating bath, the pH value of the solution is generally a little lower than that of a solution prepared from freshly dissolved crystals due to the fact that the solution is usually buffered. On adding about 1 to 3 percent of thiourea dioxide (based on the weight of the monomers), the pH value of the resultant solution will generally be of the order of 6, so that it is still necessary to adjust the pH value as described in the preceding paragraph.

In carrying out this invention, it is important that the whole of the polymerisation be carried out in the pH range of 3.5 to 5.5. Experiments I have carried out have shown that in the absence of buffering agents, the pH value of the polymerising solution, whatever its initial value, tends to approach 7.0. Thus if the pH is below 7 initially, the pH tends to rise and if it is above 7 initially it tends to fall. It is therefore desirable that the initial pH should be such that any change taking place during polymerisation does not take the pH outside the range used in this invention, or that suitable buffering agents for example sodium acetate should be added to the polymerising solution to prevent appreciable pH changes taking place; in a further method of procedure, the pH value may be measured at appropriate intervals and adjusted as desired by adding an acid reagent.

With the acrylic type of fibre, it is the practice to stabilise the fibres intended for specific textile uses by a steaming operation for example as described in United States Patent No. 8,748,426 in which part of the heat-stretched fibre is relaxed by subjecting to steam at about 5 to 20 pounds per square inch. In such a process discolouration generally occurs which is objectionable particularly where the fibre is to be used subsequently in pale shades. By polymerising at low pH values in accordance with this invention the extent of the steaming discolouration is appreciably decreased.

By operating at the pH range specified in this invention, the colour of the spinning solution is improved, the colour of films or fibres produced from the spinning solution is improved and the amount of discolouration occurring when the fibre is subjected to steaming at superatmospheric pressure is appreciably diminished.

The invention is illustrated by the following examples in which parts and percentages are by weight.

*Example 1*

0.75 part of azo bis-isobutyronitrile was dissolved in a mixture of 69.75 parts of acrylonitrile and 4.5 parts of methyl acrylate. 0.75 part of thiourea dioxide was dissolved in 425 parts of a 51 percent aqueous solution of sodium thiocyanate, and the two solutions were mixed. A solution containing 0.75 part of itaconic acid was added and the solution obtained, the pH of which was 2.8, was divided into 5 portions. These solutions were adjusted to pH 4, 5, 6, 7 and 8 respectively by the addition of sodium hydroxide, and were then heated at 80° centigrade for 1 hour to effect polymerisation. Throughout this example the pH values quoted were measured on a pH meter using a lithium glass electrode.

The pH of each polymerised solution was measured and its concentration of polymer determined. The colour of the solution after dilution to 2.5 percent polymer concentration with solvent was also measured as optical density (O.D.) using a 2 cm. cell.

The results are given in the table below:

| pH of soln. before polymerisation | pH of soln. after polymerisation | Conversion (percent) | O.D. of soln. (2.5% polymer) |
|---|---|---|---|
| 4 | 4.25 | 77 | 0.04 |
| 5 | 5.5 | 78 | 0.062 |
| 6 | 6.4 | 76 | 0.17 |
| 7 | 6.8 | 80 | 0.182 |
| 8 | 7.1 | 83 | 0.18 |

The five spinning solutions prepared in this manner were spun into distilled water and the resultant threads were stretched eight times in steam, washed free from the thiocyanate and dried. The fibres prepared from the solutions with initial pH values 7 and 8 were pale cream in colour, those from the pH 6 solutions were somewhat less coloured and those from the pH 4 and pH 5 solutions really white. The fibres prepared from the pH 5 solution and those prepared from the pH 8 solution were placed in an autoclave at 20 p.s.i. steam pressure for 20 minutes. The fibres prepared from the pH 8 solution were distinctly yellow in colour, while those prepared from the pH 5 solution were much less discoloured and were similar to the unsteamed pH 8 fibre.

*Example 2*

141 parts of acrylonitrile, 9 parts of methyl acrylate and 1.5 parts of azo-bis-isobutyronitrile were dissolved in 850 parts of 50 percent aqueous sodium thiocyanate; the pH of the solution was 7.5. The solution was then divided into two parts. One part (A) was left unchanged and the pH of the other part (B) was adjusted with dilute hydrochloric acid to 4.5.

The two solutions A and B were then immersed for 45 minutes in tubes in a water bath at 80° centigrade to effect polymerisation and to produce solutions suitable for spinning. For solution A, which started at pH 7.5, the colour was 350, the polymer concentration in the solution was 11.9 percent and the final pH was 7.1. For solution B the colour was 200, the polymer concentration was 13.6 percent and the final pH was 5.0.

The colour measurements given in this example are the concentrations in milligrams per litre of the aqueous solution of potassium chromate which matches the colour of the polymer solution.

*Example 3*

141 parts of acrylonitrile, 9 parts of methyl acrylate and 2.5 parts of azo-bis isobutyric acid ethyl ester were dissolved in 850 parts of 50 percent sodium thiocyanate. The pH of the solution was 7.8. The solution was divided into 4 parts and the pH of the parts was adjusted by adding aqueous hydrochloric acid to 3.5, 4.5, 5.5 and 6.5 respectively. The four solutions were then heated in the same water bath at 77° centigrade to effect polymerisation.

The solution of initial pH 3.5 had a final pH of 3.8 and its colour was pale yellow.

The solution of initial pH 4.5 had a final pH of 4.9 and its colour also was pale yellow.

The solutions of initial pH 5.5, and 6.5 had final pH values of 5.9 and 6.6 respectively and both solutions were brown in colour and were clearly inferior to the other two solutions.

What I claim is:

1. A process for the production of a solution of a polymer of acrylonitrile containing at least 80 percent by weight of acrylonitrile in the polymer, which solution is capable of being extruded directly into a coagulating bath without previous precipitation, which process comprises dissolving a substance consisting essentially of a polymerisable material selected from the group consisting of monomeric acrylonitrile and mixtures of acrylonitrile with styrene, methyl acrylate, vinyl acetate, vinyl pyridine and itaconic acid, said mixtures containing at least 80 percent acrylonitrile, in an aqueous solution containing a thiocyanate ion as the sole inorganic anionic component, and heating the solution so obtained at a pH in the range of 3.5 to 5.5 to a temperature of at least 50° C., in the presence of (a) a catalyst selected from the group consisting of azo-bis-isobutyronitrile, azo-bis-isobutyric acid esters, diazoamino-benzene, phenyl - diazoamine - N - diethyl ethylene diamine, diazoaminotetrazole, p,p'-dinitrodiphenyl - azosulphone, diazoanhydride, potassium azo-disulphonate, diazonium diphenylamine and mixtures thereof as the sole polymerisation catalyst, and (b) 1 to 3 percent by weight of thiourea dioxide, based on the weight of the polymerisable material, to polymerise said substance in said solution.

2. A process as claimed in claim 1, in which the sole polymerisation catalyst is azo-bis-iso-butyronitrile.

3. A process as claimed in claim 2, in which the pH is in the range of 4 to 5.

References Cited in the file of this patent

UNITED STATES PATENTS

| | | |
|---|---|---|
| 2,486,241 | Arnold | Oct. 25, 1949 |
| 2,486,943 | Hammer | Nov. 1, 1949 |
| 2,648,647 | Stanton et al. | Aug. 11, 1953 |
| 2,837,492 | Stanton et al. | June 3, 1958 |
| 2,923,694 | Schmidt | Feb. 2, 1960 |